United States Patent
Spielvogel et al.

(10) Patent No.: US 9,005,562 B2
(45) Date of Patent: Apr. 14, 2015

(54) AMMONIA BORANE PURIFICATION METHOD

(71) Applicants: BoroScience International, Inc., Columbia, SC (US); WeylChem Sustainable Materials, LLC, Elgin, SC (US)

(72) Inventors: Bernard Franklin Spielvogel, Mt. Airy, NC (US); Kevin Joel Drost, Lugoff, SC (US)

(73) Assignees: BoroScience International, Inc., Columbia, SC (US); WeylChem Sustainable Materials, LLC, Elgin, SC (US)

( * ) Notice: Subject to any disclaimer, the term of this patent is extended or adjusted under 35 U.S.C. 154(b) by 270 days.

(21) Appl. No.: 13/729,316

(22) Filed: Dec. 28, 2012

(65) Prior Publication Data

US 2014/0186252 A1 Jul. 3, 2014

(51) Int. Cl.
*C01B 35/14* (2006.01)
*C01B 35/18* (2006.01)
*C01B 21/087* (2006.01)

(52) U.S. Cl.
CPC ............ *C01B 35/146* (2013.01); *C01B 21/087* (2013.01)

(58) Field of Classification Search
CPC ............................ C01B 35/146; C01B 21/087
USPC ................................................ 423/284, 285
See application file for complete search history.

(56) References Cited

U.S. PATENT DOCUMENTS

| | | |
|---|---|---|
| 3,313,603 A | 4/1967 | Hough et al. |
| 3,882,037 A | 5/1975 | Brown |
| 4,801,439 A | 1/1989 | Blum et al. |
| 5,808,070 A | 9/1998 | Noth et al. |
| 6,586,563 B1 | 7/2003 | Ortega et al. |
| 7,695,704 B2 | 4/2010 | Wolf et al. |
| 7,897,129 B2 | 3/2011 | Autrey et al. |
| 8,038,980 B2 | 10/2011 | Yang et al. |
| 2007/0243122 A1 | 10/2007 | Ramachandran et al. |
| 2008/0159949 A1 | 7/2008 | Mohajeri et al. |
| 2008/0175781 A1 | 7/2008 | Thorn et al. |
| 2009/0104102 A1 | 4/2009 | Shore et al. |

(Continued)

FOREIGN PATENT DOCUMENTS

| | | |
|---|---|---|
| JP | 2012-001419 | 5/2012 |
| WO | WO 2011028303 | 3/2011 |
| WO | 2011/144878 A1 | 11/2011 |

OTHER PUBLICATIONS

Bakus et al. "Boron—Nitrogen Compounds" Encyclopedia of Inorganic and Bioinorganic Chemistry [Online] 2011.

(Continued)

*Primary Examiner* — Anthony J Zimmer
*Assistant Examiner* — Justin Bova
(74) *Attorney, Agent, or Firm* — Monahan & Company, LLC; Timothy J. Monahan

(57) ABSTRACT

A method of purifying ammonia borane is provided whereby crude ammonia borane is dissolved in a basic aqueous solution, the solution is heated to decompose and precipitate impurities found in the crude ammonia borane, and the impurities are separated by filtration. The aqueous solution containing dissolved ammonia borane is then cooled to a temperature of from 10° C. to −10° C., to precipitate the ammonia borane, which is recovered and dried to yield a high-purity product.

32 Claims, 1 Drawing Sheet

(56) References Cited

U.S. PATENT DOCUMENTS

| | | | |
|---|---|---|---|
| 2009/0291039 A1 | 11/2009 | Autrey et al. | |
| 2010/0230636 A1 | 9/2010 | Hsueh et al. | |
| 2010/0272623 A1 | 10/2010 | Lukacs et al. | |
| 2010/0329974 A1 | 12/2010 | Chen et al. | |
| 2011/0064640 A1 | 3/2011 | Kaye et al. | |
| 2011/0104046 A1 | 5/2011 | Abdur-Rashid et al. | |
| 2011/0158881 A1 | 6/2011 | Chen et al. | |
| 2012/0014857 A1 | 1/2012 | Shore et al. | |
| 2013/0121905 A1* | 5/2013 | Goudon et al. | 423/285 |

OTHER PUBLICATIONS

Bluhm et al. "Amineborane-Based Chemical Hydrogen Storage: Enhanced Ammonia Borane Dehydrogenation in Ionic Liquids" Journal of the American Chemical Society [Online] 2006, 128, pp. 7748-7749.

Denney et al. "Efficient Catalysis of Ammonia Borane Dehydrogenation" Journal of the American Chemical Society [Online] 2006, 128, pp. 12048-12049.

Heldebrant et al. "Synthesis of Ammonia Borane for Hydrogen Storage Applications" Energy & Environmental Science [Online] 2008, 1, pp. 156-160.

Hu et al. "New Synthetic Approaches to Ammonia-Borane and Its Deuterated Derivatives" Journal of Inorganic and Nuclear Chemistry [Online] 1977, 39, pp. 2147-2150.

Jaska et al. "Transition Metal-Catalyzed Formation of Boron-Nitrogen Bonds: Catalytic Dehydrocoupling of Amine-Borane Adducts to Form Aminoboranes and Borazines" Journal of the American Chemical Society [Online] 2003, 125, pp. 9424-9434.

Karkamkar et al. "Recent Developments on Hydrogen Release from Ammonia Borane" Material Matters [Online] 2007, 2, pp. 1-9.

Parry et al. "Annual Report: The Chemistry of Boron Hydrides and Related Hydrides WADC Technical Report 57-11" Engineering Research Institute, The University of Michigan Ann Arbor [Online] 1957, pp. 1-32.

Ramachandran et al. "Preparation of Ammonia Borane in High Yield and Purity, Methanolysis, and Regeneration" Inorganic Chemistry [Online] 2007, 46, pp. 7810-7817.

Sanyal et al. "Hydrolysis of Ammonia Borane as a Hydrogen Source: Fundamental Issues and Potential Solutions Towards Implementation" ChemSusChem [Online] 2011, 4, pp. 1731-1739.

Shore et al. "Chemical Evidence for the Structure of the Diammoniate of Diborane. II. The Preparation of Ammonia-Borane" Journal of the American Chemical Society [Online] 1958, 80, pp. 8-12.

Shore et al. "The Crystalline Compound Ammonia-Borane, H3NBH3" Journal of the American Chemical Society [Online] 1955, 77, pp. 6084-6085.

Stephens et al. "Acid Initiation of Ammonia-Borane Dehydrogenation for Hydrogen Storage" Angewandte Chemie International Edition [Online] 2007, 46, pp. 746-749.

Patent Cooperation Treaty, International Search Report, May 2, 2014.

* cited by examiner

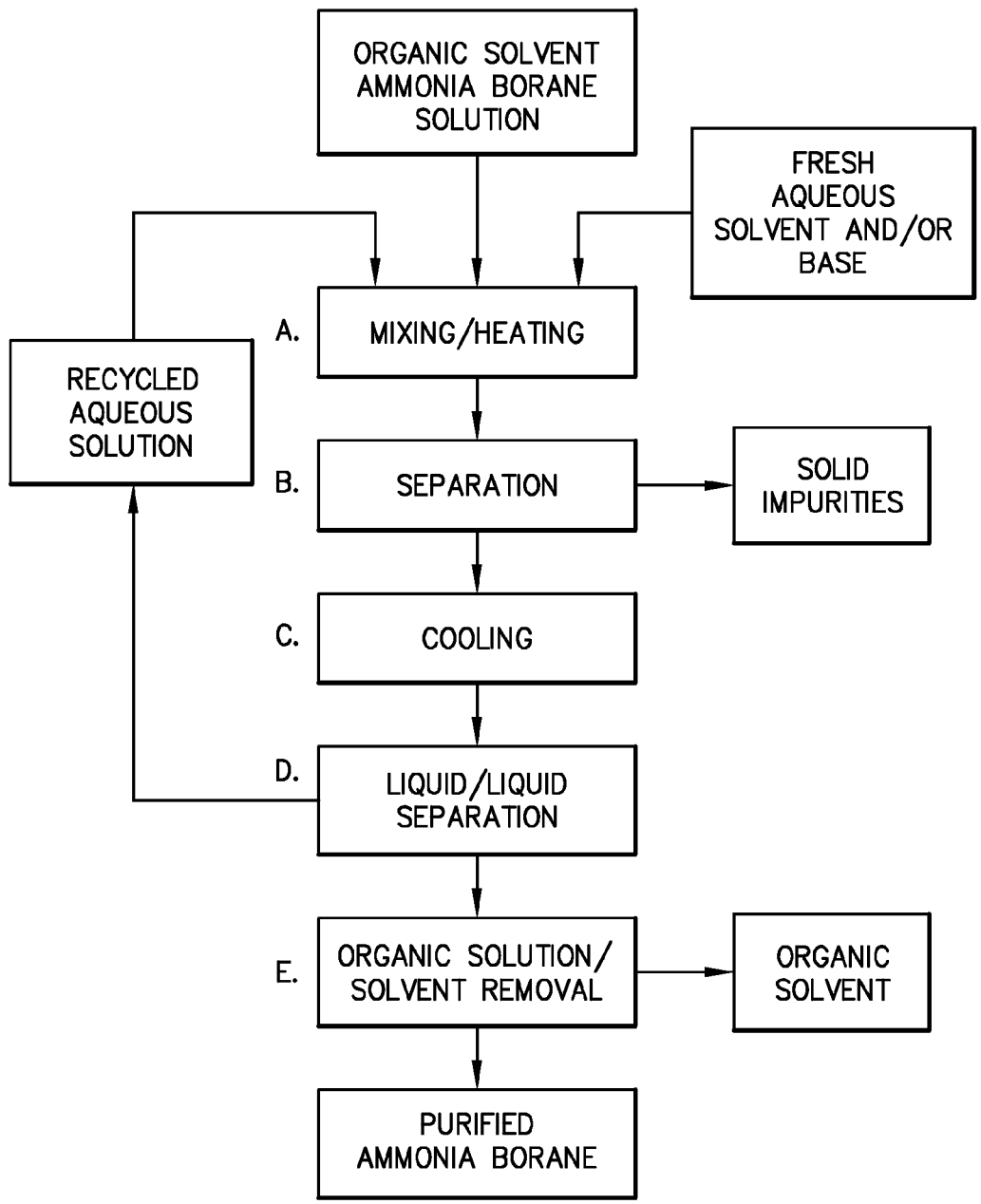

AMMONIA BORANE PURIFICATION METHOD

This invention is directed to a method of purifying ammonia borane, which includes the steps of forming a solution of crude ammonia borane in a basic aqueous solvent, heating the aqueous solution to decompose and precipitate impurities, and removing the impurities by filtration. The aqueous solution is then cooled to decrease the solubility of the ammonia borane in the aqueous solvent, which causes a portion of the ammonia borane to precipitate or partition into an organic solvent present in the system. The portion of the ammonia borane no longer dissolved in the aqueous solvent is then separated from the aqueous solution and recovered to yield a high-purity product.

BACKGROUND OF THE INVENTION

Ammonia borane, also referred to as ammonium borane and borazane, has been investigated as an energy-dense source of hydrogen, for example, for use in hydrogen related power generation. Methods of synthesis of ammonia borane are disclosed in Ramachandran et al. US 2007/0243122 A1 ("Ramachandran"). Briefly, the process involves reacting a metal borohydride with an ammonia salt, in a suitable solvent. For example, sodium borohydride is reacted with ammonium carbonate in an ether solvent, such as tetrahydrofuran ("THF") or dioxane. Following the reaction to form ammonia borane, the solution is filtered and the solvent is removed under vacuum to yield solid ammonia borane. The recovered ammonia borane powder may be purified by extraction with a suitable solvent, followed by removal of the solvent under reduced pressure, to yield a solid ammonia borane of relatively high purity.

A shortcoming of prior art ammonia borane purification methods is that many of the impurities present in the crude ammonia borane are also soluble in the solvent used to extract the ammonia borane. Consequently, when the solvent is evaporated from the ammonia borane solution, such impurities remain in the recovered product. Thus, despite the methods disclosed by Ramachandran and others, a need remains for an ammonia borane purification method that is economical to operate commercially and yields high-purity ammonia borane.

SUMMARY OF THE INVENTION

An object of the invention is to provide high-purity ammonia borane, for example, ammonia borane having a purity of 99% or higher, by weight. Another object of the invention is to provide an ammonia borane purification method that allows for selective removal of the impurities present in the crude ammonia borane. Another object of the invention is to provide a method wherein the solubility of ammonia borane in a solvent varies significantly over a practical operating temperature range, e.g. from 100° C. to −10° C. Yet another object of the invention is to provide a method of ammonia borane purification that is economical to operate commercially and can be adapted to either a batch or continuous process.

These objectives are met by one or more of the following embodiments of the present invention.

The present method may be employed to purify crude ammonia borane produced by any of a variety of processes. The crude ammonia borane may be an isolated solid, such as a dry powder, a wet filter cake, or the crude ammonia borane may be suspended in a suitable organic liquor. An aqueous solution of crude ammonia borane in an aqueous solvent having a basic pH may be formed by dissolving crude ammonia borane provided in solid form.

Alternatively, the crude ammonia borane may be dissolved in an organic solvent and employed in the purification method. An aqueous solution of crude ammonia borane in a basic aqueous solvent is formed by adding the basic aqueous solvent to a solution of the crude ammonia borane in an organic solvent, whereby the ammonia borane is caused to partition into the aqueous solvent. The basic aqueous solvent and the organic solvent form a two-phase system.

Many of the impurities present in the crude ammonia borane are soluble in the aqueous solvent and are also dissolved. The solution is then heated, which causes the dissolved impurities to decompose and precipitate from the solution. The impurities are then separated from the mixture, for example, by filtration. In one embodiment of the invention, 75% by weight, and preferably 90% by weight, of the impurities contained in the crude ammonia borane are removed from the mixture.

The aqueous ammonia borane solution (filtrate) is then cooled to decrease the solubility of the ammonia borane in the basic aqueous solvent. At least a portion of the ammonia borane originally in the aqueous solution is caused to precipitate. The precipitated ammonia borane is separated from the mixture, for example by filtration, and dried, to yield a high-purity product. In the embodiment of the invention in which an organic solvent is present in the system, at least a portion of ammonia borane originally in the aqueous solution is caused to partition into the organic solvent, when the system is cooled.

Typically, a portion of the ammonia borane remains dissolved in the aqueous solvent, after the aqueous solution is cooled to decrease the solubility of the ammonia borane. For example, the aqueous solution may be cooled so that 50% or more, preferably 65% or more, of the ammonia borane present in the aqueous solution is removed, that is, the ammonia borane precipitates or partitions into an organic solvent. After separating the aqueous solution from the portion of ammonia borane that is no longer dissolved in the basic aqueous solvent, the aqueous solution may be recycled in the process. For example, the recycled aqueous solution containing from 10% to 25% of the ammonia borane present in the aqueous solution prior to the solution being cooled to decrease the solubility of the ammonia borane therein, may be used for forming an aqueous solution with additional crude ammonia borane. The pH of the recycled stream may be adjusted upward, for example, by adding ammonia, prior to adding crude ammonia borane.

BRIEF DESCRIPTION OF THE DRAWINGS

FIG. 1 is a flow diagram of a continuous process for purifying ammonia borane.

DETAILED DESCRIPTION OF THE INVENTION

Without limiting the scope of the invention, the preferred embodiments and features are hereinafter set forth. All of the United States patents and published applications, which are cited in the specification, are hereby incorporated by reference. Unless otherwise indicated, conditions are 25° C., 1 atmosphere of pressure and 50% relative humidity, concentrations are by weight, molecular weight is based on weight average molecular weight and aliphatic hydrocarbons and radicals thereof are from one to four carbon atoms in length.

Synthesis of Crude Ammonia Borane

The crude ammonia borane that is purified according to the method of the present invention may be obtained from a variety of sources. For example, a metal borohydride may be reacted with an ammonia salt in an organic ether, such a tetrahydrofuran ("THF") or dioxane. Processes for synthesizing ammonia borane are disclosed in the following references: Ramachandran et al. U.S. 2007/0243122 A1; Autrey et al. U.S. Pat. No. 7,897,129 B2; Yang et al. U.S. Pat. No. 8,038,980 B2; Shore et al. U.S. 2009/0104102 A1; Lukacs et al. U.S. 2010/0272623 A1; Kaye et al. U.S. 2011/0064640 A1; and Kikukawa Yasuo JP 2012-001419 A.

By way of example, the metal borohydride may be selected from lithium borohydride and sodium borohydride, and the ammonia salt may be selected from ammonium sulfate, ammonium chloride, ammonium fluoride, ammonium carbonate, ammonium nitrate, ammonium acetate, or ammonium formate. The reaction is conducted in an organic solvent in which ammonia borane is soluble, such as an organic ether. Suitable organic ethers include THF, 2-methyltetrahydrofuran, diethylether and dioxane. In one process for synthesizing ammonia borane, sodium borohydride and ammonium carbonate react in THF to form ammonia borane.

The crude ammonia borane may be in the form of isolated solids. For example, after the synthesis reaction is complete, the mixture is filtered to remove insoluble by-products, followed by evaporation of the organic solvent from the filtrate, for example, by stripping the solvent under vacuum. After the solvent is removed, crude ammonia borane in solid form is recovered.

The crude ammonia borane may be in the form of a solution in an organic solvent. For example, after the synthesis reaction is complete, the mixture is filtered to remove insoluble by-products. The crude ammonia borane remains dissolved in the organic solvent in which the synthesis was conducted.

The crude ammonia borane may be in the form of a suspension or slurry in an organic liquor. For example, after the synthesis of ammonia borane in the presence of an organic ether, most of the organic ether is stripped off and an organic liquid is added to the vessel. The organic liquid has the properties of being water immiscible and the ammonia borane is insoluble therein. Furthermore, the organic liquid is selected to have a boiling point higher than the organic ether solvent and facilitates stripping the remaining organic ether solvent from the liquor. Then, any remaining organic ether solvent is removed from the vessel, and the crude ammonia precipitates as a suspension or slurry in the organic liquid. Examples of suitable organic liquids include pentane, hexane and heptane, in particular, the straight chain (n-) isomers thereof. The use of THF as the reaction solvent and n-heptane as the organic liquid has been found to be useful.

Purification of Crude Ammonia Borane

Crude ammonia borane, that is, ammonia borane having a purity of less than 99%, may be purified according to the following methods. The crude ammonia borane may be obtained from the above described methods of synthesis and may be isolated as a dry or wet solid, or the ammonia borane may be in a suspension in an organic liquor or dissolved in an organic solvent.

An aqueous solution of crude ammonia borane in an aqueous solvent having a basic pH may be formed by dissolving crude ammonia borane provided in solid form. Alternatively, an aqueous solution of crude ammonia borane in a basic aqueous solvent is formed by adding the basic aqueous solvent to a solution of the crude ammonia borane in an organic solvent, whereby the formation of the aqueous solution is conducted at a temperature at which the solubility of the ammonia borane is greater in the basic aqueous solvent than in the organic solvent. The basic aqueous solvent and the organic solvent form a two-phase system, although minor amounts, for example 10% by weight or less, of the organic solvent may be soluble in the aqueous solvent, especially when the system is heated.

Regardless of the whether the crude ammonia borane is provided as a solid or dissolved in an organic solvent, the first step of the purification method is to form an aqueous solution of the crude ammonia borane in an aqueous solvent having a basic pH. Accordingly, the identity of the aqueous solvent, pH of the aqueous solvent, concentration of crude ammonia borane and temperature are selected to create such an aqueous solution. Furthermore, the foregoing parameters are selected so that the solubility of the ammonia borane in the basic aqueous solvent varies by 50% or more over a temperature range of 50° C. or less, in particular, by 65% or more over a temperature range of 50° C. or less. Additionally, the parameters are selected to facilitate decomposition of the impurities, thereby rendering them insoluble in the basic aqueous solvent, when the solution is heated during the implementation of the subject purification method.

By way of example, the pH of the aqueous solvent used to dissolve the crude ammonia borane is from 8 to 13.5, in particular, from 8 to 12. Suitable aqueous solvents include solutions of inorganic hydroxides, such as alkali metal hydroxides, alkaline earth metal hydroxides and ammonium hydroxide. Aqueous solutions of water-soluble, substituted ammonium hydroxides may also be employed, such as compounds in which the ammonium ion has from 1 to 4 substituent groups selected from alkyl, alkyl alcohol or alkyl ether groups. In one embodiment of the invention, the hydroxide compound in the basic aqueous composition comprises a volatile cationic counter ion, which evaporates when the purified ammonia borane is recovered and dried, later in the process. Cationic counter ions that evaporate at 100° C. or less, may be used. The purified ammonia borane may be dried under vacuum, to avoid melting or decomposing the product.

In one embodiment of the invention, the crude ammonia borane is provided as a suspension in the organic liquid, such as n-heptane. Upon addition of the basic aqueous solvent, the ammonia borane is dissolved, and a two phase system forms, with substantially all of the ammonia borane dissolved in the aqueous phase. At this juncture, the organic liquid may be removed from the system, for example, by any process suitable for phase separation of immiscible liquids. Alternatively, the purification process may be conducted with a portion or all of the organic liquid present.

When the crude ammonia borane is dissolved in the basic aqueous solvent, many of the impurities are also dissolved. It has been found that heating the solution causes a significant portion of the impurities to decompose and precipitate from the solution. By way of example, the solution may be heated to a temperature of 30° C. or greater, in particular, to a temperature of 30° C. to 50° C. Without being bound to a particular theory, it is believed that the impurities include borates and boric acids, and cyclic borazines, which decompose to form water insoluble species, when the aqueous solution is heated. By practicing the subject method, 75% or more by weight, or even 90% or more by weight, of the dissolved impurities that are introduced in the crude ammonia borane can be caused to precipitate.

After impurities in the solution are caused to precipitate by heating the solution, the solids are separated from the solution, for example, by filtration. The solids include impurities that were present in the crude ammonia borane and insoluble in the basic aqueous solvent, as well as soluble impurities that decomposed and precipitated from solution. The solid impurities may contain minor amounts of the aqueous solution, with ammonia borane dissolved therein. The impurity stream may be recycled in the process to recover the ammonia borane. The mixture may be filtered while it is still hot, or it may be allowed to cool, taking care not to cause the ammonia borane to precipitate from the solution.

After the insoluble impurities have been separated from the aqueous solution of ammonia borane, the solution is cooled to decrease the solubility of the ammonia borane in the aqueous solvent. By way of example, the solution is cooled to a temperature of 15° C. or lower, in particular, to a temperature of from 10° C. to −10° C. The conditions of the process, e.g. temperature and time, may be selected to achieve a decrease of 50% or more, 65% or more, or even 75% or more of the ammonia borane present in the aqueous solution.

In one embodiment of the invention, the portion of the ammonia borane that is no longer soluble in the aqueous solvent is caused to precipitate. The precipitated ammonia borane is separated from the aqueous liquor, for example, by filtration, and dried. Prior to drying, the filtered ammonia borane solids may be washed with a suitable liquor, especially a liquor that displaces residual aqueous solvent retained on the ammonia borane solids and is readily volatilized in the drying process.

Alternatively, when an organic solvent is present in the system and the solubility of the ammonia borane in the aqueous solvent is decreased by cooling the system, ammonia borane is caused to partition into the organic solvent. The aqueous solution, absent the ammonia borane that is no longer soluble therein, and the organic solvent are then separated by, for example by phase separation, and the organic solvent is evaporated to recover high-purity ammonia borane.

After precipitation of ammonia borane and removal from the liquor, the filtrate containing dissolved ammonia borane may be recycled in the process. For example, the recycled filtrate stream may be introduced at the beginning of the purification process to dissolve crude ammonia borane, along with make-up basic aqueous solvent, and/or additional base or precursor thereof, such as ammonia, to adjust the pH and volume to the desired concentrations. The recycled filtrate may contain from 5 to 35 weight %, in particular from 10 to 25 weight %, of the ammonia borane originally dissolved in the aqueous solution, at the start of the purification process.

The recycled aqueous solution containing ammonia borane that remains in solution after a portion of the ammonia borane has been driven out of solution by cooling can be advantageously used in a continuous purification process. Referring to FIG. 1, a representative flow diagram of a continuous purification process is illustrated. A recycled stream of aqueous ammonium hydroxide solution containing ammonia borane, a stream of crude ammonia borane dissolved in THF from a synthesis reaction, and a stream of make-up aqueous ammonium hydroxide and/or ammonia are combined in a reactor and heated in step "A". Substantially all of the ammonia borane added in the THF solution partitions into the aqueous solution. Heating the system causes impurities present to decompose and precipitate. The precipitated impurities are removed by filtration in step "B". The filtrate is cooled causing a portion of the ammonia borane to partition into the THF in step "C". The aqueous solution and the THF, each of which contain ammonia borane, are separated in step "D". The aqueous solution is recycled back to step "A". The THF stream is spray dried at step "E", to yield purified ammonia borane. While the process has been described with specific organic and basic aqueous solvents, as well as specific methods of separating the various material streams, persons skilled in the art may readily understand that the continuous process may be practiced as broadly described herein.

Example 1

THF (615 g/K$_f$≤0.1%) was charged to a 1 L jacketed flask, equipped with an agitator, condenser and feed system. Then, sodium borohydride (31.0 gm, 0.819 mol) was charged to the flask and the mixture was warmed to 30-35° C. During heating, the jacket temperature was not allowed to rise above 35° C. Once the flask reached the desired temperature range, ammonium carbonate (78.5 gm, 0.80 mol) was added over a one hour period, and off-gassing of hydrogen was observed. Once all of the ammonium carbonate has been added, the flask was slowly warmed to 42-45° C. at a rate of 1° C./hour, to control off gassing of hydrogen. Approximately 18 L of hydrogen was generated during the reaction. A flow of nitrogen was used during the reaction to dilute the hydrogen. Once the jacket temperature was reached, the flask was digested for an additional 4 to 6 hours. Following the digestion period, the flask was cooled to 25-30° C. At this time, the by-product, sodium ammonium carbonate (200-220 grams wet, 75-90 dry), was filtered to give a clean, clear THF solution. The mother liquor was charged back to the flask and stripped at 35-40° C. with vacuum. The strip was continued until 90-95% of the mother liquor weight was removed. At this point, the vacuum was broken with nitrogen, and heptane (100-120 gm) was added to the flask. The flask was restriped to remove the remainder of the THF. Once the remainder of the THF was removed, the flask was cooled to room temperature and ammonium hydroxide (30 gram—28% concentration) was added. Two layers of liquid were formed. The slurry was heated to 40-42° C. and held for 4 hours to decompose any impurities. The solution was cooled to 25-30° C. and filtered to remove approximately 1-2 grams of impurities. The clear colorless liquor containing heptane and ammonium hydroxide with ammonia borane dissolved therein was cooled to 10 to 0° C. and held for 30 minutes, and ammonia borane precipitated from the solution. The resulting white solid was pure ammonium borane, which was filtered to give 12.5-14.0 grams of wet cake. The wet cake was air dried to yield pure ammonia borane as a white solid (12.5-13.0 grams, 50-53% yield), with an assay by GC of 99-99.5%.

Applications of Ammonia Borane

The high-purity ammonia borane made according to the present invention has application as a storage medium for hydrogen in vehicles containing fuel cells, as well as for any other applications where reagent grade ammonia borane may be advantageously employed. Examples of applications for ammonia borane may be found in the following references: Mohajeri et al. U.S. 2008/0159949 A1; Hsueh et al. 2010/0230636 A1; Chen et al. U.S. 2010/0329974 A1; Abdur-Rashid et al. U.S. 2011/0104046 A1; Chen et al. U.S. 2011/0158881 A1; and Balema et al. WO 2011/02303.

The invention may be further understood by reference to the following claims.

What we claim is:

1. A method of purifying crude ammonia borane, comprising the steps of:
   (a) forming an aqueous solution of crude ammonia borane in a basic aqueous solvent;
   (b) heating the aqueous solution to decompose and precipitate impurities present in the crude ammonia borane;
   (c) separating the precipitated impurities from the aqueous solution;
   (d) cooling the aqueous solution to decrease the solubility of the ammonia borane in the basic aqueous solvent, whereby a portion of ammonia borane is no longer dissolved in the basic aqueous solvent; and (e) separating the aqueous solution from the portion of ammonia borane that is no longer dissolved in the basic aqueous solvent.

2. The method of claim 1, wherein the aqueous solution has a pH of from 8 to 13.5.

3. The method of claim 2, wherein the aqueous solution comprises an inorganic hydroxide selected from the group consisting of alkali metal hydroxides, alkaline earth metal hydroxides and ammonium hydroxide.

4. The method of claim 2, wherein the aqueous solution comprises a water-miscible hydroxide selected from the group consisting of ammonium hydroxide, and substituted ammonium hydroxide having from 1 to 4 alkyl, alkyl alcohol or alkyl ether groups.

5. The method of claim 2, wherein the aqueous solution comprises ammonium hydroxide.

6. The method of claim 1, wherein the aqueous solution is heated to a temperature of 30° C. or greater.

7. The method of claim 1, wherein the aqueous solution is heated to a temperature of from 30° C. to 50° C.

8. The method of claim 1, wherein the aqueous solution is heated until at least 75% by weight of the impurities in the crude ammonia borane precipitate.

9. The method of claim 1, wherein the precipitated impurities are separated by filtration, and then the aqueous solution is cooled to a temperature of 15° C. or lower.

10. The method of claim 1, wherein the aqueous solution is cooled to a temperature of from 10° C. to −10° C., to decrease the solubility of the ammonia borane in the basic aqueous solvent.

11. The method of claim 1, wherein the aqueous solution is cooled until 50% or more of the ammonia borane present in the aqueous solution is no longer dissolved therein.

12. The method of claim 11, further comprising the step of recycling a stream of the aqueous solution, after the portion of ammonia borane that is no longer dissolved in the basic aqueous solvent has been separated from the aqueous solution, by forming an aqueous solution with additional crude ammonia borane and the recycled aqueous solution stream.

13. The method of claim 12, wherein the aqueous solution is cooled until from 10 to 25% of the ammonia borane present in the formed basic aqueous solution remains dissolved therein.

14. The method of claim 1, wherein the purification is conducted as a batch process.

15. The method of claim 1, wherein the purification is conducted as a continuous process.

16. The method of claim 1, whereby cooling the aqueous solution to decrease the solubility of the ammonia borane in the basic aqueous solvent causes ammonia borane to precipitate, and the precipitated ammonia borane is separated from the aqueous solution by filtration.

17. The method of claim 1, wherein the aqueous solution of crude ammonia borane in a basic aqueous solvent is formed by adding a mixture of crude ammonia borane and an organic liquid to the basic aqueous solvent, whereby the formation of the aqueous solution is conducted at a temperature at which the solubility of the ammonia borane is greater in the basic aqueous solvent than in the organic liquid, and wherein the basic aqueous solvent and the organic liquid form a two-phase system.

18. The method of claim 17, wherein the mixture of crude ammonia borane and organic liquid is a solution, and cooling the formed aqueous solution to decrease the solubility of the ammonia borane in the basic aqueous solvent causes the portion of ammonia borane that is no longer dissolved in the aqueous solvent to partition back into the organic liquid.

19. The method of claim 18, further comprising the step of separating the aqueous solution from the organic liquid, after the portion of ammonia borane is caused to partition back into the organic liquid.

20. The method of claim 19, further comprising the step of evaporating the organic liquid and recovering ammonia borane.

21. The method of claim 18, wherein the organic liquid is an ether.

22. The method of claim 18, wherein the organic liquid is selected from the group consisting of tetrahydrofuran, 2-methyltetrahydrofuran, diethylether and dioxane.

23. The method of claim 17, wherein the crude ammonia borane is suspended in the organic liquid when the aqueous solution of ammonia borane in the basic aqueous solvent is formed.

24. The method of claim 23, wherein the organic liquid is removed by phase separation, after the aqueous solution is formed.

25. The method of claim 23, wherein the organic liquid is selected from the group comprising n-pentane, n-hexane and n-heptane.

26. A method of purifying crude ammonia borane, comprising the steps of:

(a) dissolving crude ammonia borane in a basic aqueous solvent to form an aqueous solution;

(b) heating the aqueous solution to decompose and precipitate impurities present in the crude ammonia borane;

(c) separating the precipitated impurities from the aqueous solution;

(d) cooling the aqueous solution to decrease the solubility of the ammonia borane in the basic aqueous solvent, whereby a portion of ammonia borane is precipitated; and (e) separating the aqueous solution from the portion of ammonia borane that has precipitated.

27. The method of claim 26, wherein the aqueous solution is cooled to a temperature of 15° C. or lower, and 50% or more of the ammonia borane present in the aqueous solution is no longer dissolved therein.

28. The method of claim 26, wherein the aqueous solution is cooled to a temperature of from 10° C. to −10° C., and from 10 to 25% of the ammonia borane present in the formed basic aqueous solution remains dissolved therein.

29. A method of purifying crude ammonia borane, comprising the steps of:

(a) forming an aqueous solution of crude ammonia borane in a basic aqueous solvent by adding the basic aqueous solvent to a solution of the crude ammonia borane in an organic liquid, whereby the formation of the aqueous solution is conducted at a temperature at which the solubility of the ammonia borane is greater in the basic aqueous solvent than in the organic liquid, and wherein the basic aqueous solvent and the organic liquid form a two-phase system;

(b) heating the aqueous solution to decompose and precipitate impurities present in the crude ammonia borane;

(c) separating the precipitated impurities from the aqueous solution and organic liquid;

(d) cooling the aqueous solution and organic liquid to decrease the solubility of the ammonia borane in the basic aqueous solvent, whereby a portion of the ammonia borane is caused to partition back into the organic liquid;

(e) separating the aqueous solution from the organic liquid; and (f) evaporating the organic liquid to recover ammonia borane.

30. The method of claim 29, wherein the aqueous solution and organic liquid are cooled to a temperature of 15° C. or lower, and 50% or more of the ammonia borane present in the aqueous solution partitions into the organic liquid.

31. The method of claim 29, wherein the aqueous solution and organic liquid are cooled to a temperature of from 10° C. to −10°, and from 10 to 25% of the ammonia borane present in the formed basic aqueous solution remains dissolved therein.

32. The method of claim 29, wherein the organic liquid is an ether.

* * * * *